United States Patent Office 3,479,364
Patented Nov. 18, 1969

3,479,364
PYRIDINECARBOXYLIC ACID ESTERS OF
BENZENEHEXOL
Carl Peter Krimmel, Wauconda, Ill., assignor to G. D.
Searle & Co., Chicago, Ill., a corporation of Delaware
No Drawing. Filed July 17, 1967, Ser. No. 653,685
Int. Cl. C07d 31/36; A61k 9/04
U.S. Cl. 260—295                                3 Claims

ABSTRACT OF THE DISCLOSURE

Esterification of benzenehexol with a pyridinecarboxylic acid halide gives the corresponding hexa-esters which are useful because of their anti-atherogenic activity.

SUMMARY OF THE INVENTION

The present invention relates to a group of esters of benzenehexol. In particular, it relates to a group of compounds having the following general formula

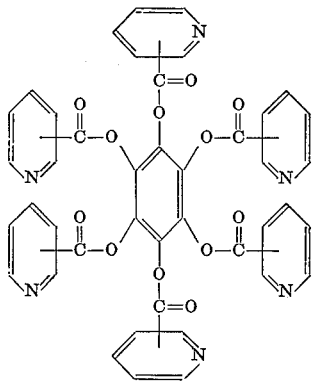

The acid portion of these esters is derived from a pyridinecarboxylic acid; it can be picolinic, nicotinic, or isonicotinic acid.

Also encompassed by this invention are the non-toxic salts of the aforementioned organic bases, as examplified by the hydrochloride, hydrobromide, hydriodide, tartrate, succinate, malate, acetate, citrate, ascorbate, nitrate, sulfate, phosphate, and sulfamate.

The compounds of the present invention are prepared by reacting benzenehexol with a pyridinecarboxylic acid halide. The acid chloride is preferred for this reaction. The reaction can be carried out in the presence of a tertiary amine which reacts with the hydrogen chloride formed in the reaction. Pyridine is useful for this purpose and an excess of this amine can be used as the solvent for the reaction.

The present compounds are useful because of their pharmacological properties. In particular, these nictinoyl compounds possess anti-atherogenic activity. In this regard, the present nictinoyl compounds have been found to reduce the concentrations of a number of substances which occur at abnormally high levels in an atherogenic state. Thus, these compounds have been found to reduce the levels of serum triglycerides and serum chylomicrons.

The pharmacological activity of the nitinoyl compounds of this invention is specifically illustrated by the response produced in male rats to which 40 mg./kg. of benzenehexol hexanicotinoate was administered orally. The compound produced a 72% reduction in serum chylomicrons in the rats involved. Details of the test procedure involved are described by Jacobs et al., Proc. Soc. Exptl. Biol. and Med., 119, 1117 (1965).

The present substances can be administered in any of a number of conventional pharmaceutical forms and also by conventional routes. For oral administration, suitable solid forms are pills, powders, capsules, tablets, and the like, and suitable liquid forms are syrups, emulsions, elixirs, suspensions, and the like. For parenteral administration, these compounds can be dispersed in an aqueous suspension or dissolved in a pharmacologically acceptable oil or oil-water emulsion. Suitable excipients can also be added.

The present compounds also possess anti-fungal activity against *Trichophyton mentagrophytes*.

The following examples are presented to further illustrate the present invention; they should not be construed as limiting it in spirit or in scope. In these examples, quantities by weight are indicated in grams, qantities by volume are indicated in milliliters, and temperatures are indicated in degrees centigrade (° C.).

Example 1

A mixture of 36.9 grams of nicotinic acid and 100 ml. of thionyl chloride is heated on a steam bath for 2 hours. The resultant mixture is then distilled under reduced pressure on a steam bath to remove unreacted thionyl chloride. Dry benzene is added to the residue and distillation is repeated to remove final traces of thionyl chloride with the benzene. The residue which results in nicotinoyl chloride hydrochloride and it is suspended in 100 ml. of dry pyridine. A solution of 8.7 grams of benzenehexol in 50 ml. of dry pyridine is added to this acid chloride suspension and the resultant mixture is heated on a steam bath for two hours. The mixture is then heated under reduced pressure to remove the pyridine and the solid residue is broken up in a mortor with 150 ml. of cold water. A slurry is obtained and this is filtered and the separated solid is dried in a steam cabinet. The dried solid is then treated with 1500 ml. of boiling acetone and the hot solution is filtered to remove a small amount of brown precipitate. The filtrate is then treated with charcoal and concentrated to a volume of about 700 ml. The solution is allowed to stand and cool and the precipitate which forms is separated by filtration to give a light brown powder which decomposes at about 219–239° C. The product obtained in this way is benzenehexol hexanicotinoate and it has the following formula

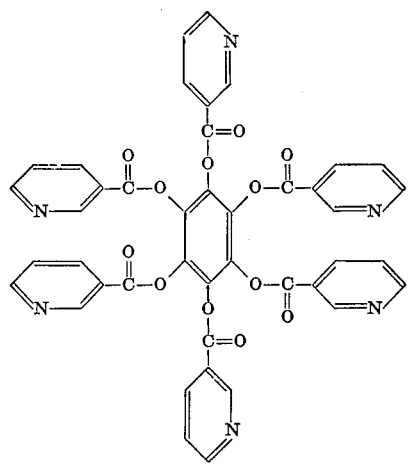

Example 2

The procedure of Example 1 is repeated starting with 36.9 grams of isonicotinic acid. This is converted to the corresponding acid chloride and reacted with 8.7 grams of benzenehexol. 5.0 grams of the solid product obtained from this reaction is stirred with 1800 ml. of boiling acetone. Only partial solution occurs and the undissolved material is removed by filtration of the hot solution. The resulting filtrate is then concentrated to a volume of about 200 ml. and cooled. A crystalline solid forms and is separated by filtration to give benezenehexol hexaisonicotinoate which decomposes at about 220–232° C.

What is claimed is:
1. A compound of the formula

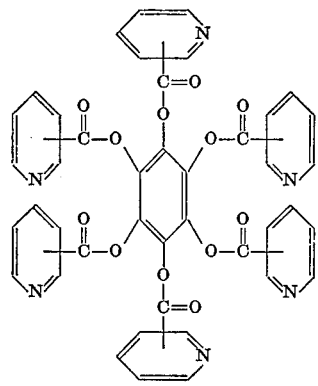

wherein the pyridyl radicals are selected in such a manner that they are identical.

2. A compound according to claim 1 which is benzenehexol hexanicotinoate.
3. A compound according to claim 1 which is benzenehexol hexaisonicotinoate.

References Cited

UNITED STATES PATENTS

| | | | |
|---|---|---|---|
| 3,299,077 | 1/1967 | Irikura et al. | 260—295.5 |
| 3,321,484 | 5/1967 | Krimmel | 260—295.5 |
| 3,384,642 | 5/1968 | Nakanishi et al. | 260—295.5 |

OTHER REFERENCES

Great Britain patent specification No. 1,022,880, published Mar. 16, 1966.

JOHN D. RANDOLPH, Primary Examiner

ALAN L. ROTMAN, Assistant Examiner

U.S. Cl. X.R.

260—295.5; 424—266